United States Patent
Haninger et al.

[11] Patent Number: 6,135,696
[45] Date of Patent: Oct. 24, 2000

[54] MACHINE TOOL CENTER

[75] Inventors: Rudolf Haninger, Seitingen; Hans-Henning Winkler, Tuttlingen, both of Germany

[73] Assignee: Chiron-Werke GmbH & Co. KG, Germany

[21] Appl. No.: 09/075,085

[22] Filed: May 6, 1998

Related U.S. Application Data

[63] Continuation of application No. 08/641,508, May 1, 1996, Pat. No. 5,871,326.

[30] Foreign Application Priority Data

May 11, 1996 [DE] Germany .................. 195 16 849

[51] Int. Cl.[7] .................................................. B65H 5/08
[52] U.S. Cl. ........................... 414/225.01; 414/226.01; 414/729; 414/736
[58] Field of Search ........................ 414/222.01, 222.06, 414/222.07, 222.08, 225.01, 226.01, 729, 736; 483/3, 15, 25, 26, 61, 62, 901

[56] References Cited

U.S. PATENT DOCUMENTS

| | | |
|---|---|---|
| 4,416,577 | 11/1983 | Inaba et al. .................. 414/226.01 X |
| 4,678,393 | 7/1987 | Mink . |
| 4,999,895 | 3/1991 | Hirose et al. .................. 414/222 X |
| 5,046,909 | 9/1991 | Murdoch ........................ 414/935 X |
| 5,302,061 | 4/1994 | Terawaki et al. . |
| 5,431,600 | 7/1995 | Murata et al. .................. 414/225 X |
| 5,564,889 | 10/1996 | Araki ............................. 414/222.01 X |

FOREIGN PATENT DOCUMENTS

| | | |
|---|---|---|
| 0 087 996 A1 | 9/1983 | European Pat. Off. . |
| 0 087 996 | 2/1983 | France . |
| 34 40 762 A1 | 5/1986 | Germany . |
| 42 34 674 A1 | 4/1993 | Germany . |

*Primary Examiner*—Donald W. Underwood
*Attorney, Agent, or Firm*—Pretty, Schroeder & Poplawski

[57] ABSTRACT

A machine tool center (10) displays at least one machine tool (11, 12, 13) which has a working area (17) accessible through an operator door (16) to process workpieces (21). Furthermore, a loading/unloading station (14) for the workpieces (21) and a loading device (22) which transports the workpieces (21) between the loading/unloading station (14) and the respective machine tool (11, 12, 13) and changes these at the machine tool (11, 12, 13) are also provided. In the new machine tool center (10) the loading device (22) is arranged below the working space (17) of the machine tool (11, 12, 13) (FIG. 1).

6 Claims, 4 Drawing Sheets

MACHINE TOOL CENTER

This application is a continuation of U.S. application Ser. No. 08/641,508, filed May 1, 1996, now U.S. Pat. No. 5,871,326.

BACKGROUND OF THE INVENTION

The present invention relates to a machine tool center with at least one machine tool which has a working space accessible through an operator door to process workpieces, a loading/unloading station for the workpieces and a loading device which transports the workpieces between the loading/unloading station and the respective machine tool and changes these at the machine tool.

1. Field of the Invention

Such machine tool centers are generally known.

2. Related Prior Art

In the known machine tool centers the loading devices are arranged in front of the respective machine tools which are installed alongside one another either in a straight line or in a circle. The loading device displays an appliance which moves back and forth between the loading/unloading station and the respective machine tool and hereby transports workpieces. In this way a large number of machine tools can be loaded by one single loading/unloading station at which the workpieces to be processed are input and from which the finished workpieces are also removed.

The loading device hereby often operates on the same level as the operator door and changes the workpieces in the machine tool through this door. The operator door is, however, simultaneously used for set-up and service work, in other words for maintenance, to change tools, to verify tools or certain geometric factors, etc.

If a fault occurs in one of the machine tools in the known machine tool center or service work becomes necessary the respective operator must reach "past the loading device" through the operator door into the working space of the machine tool to carry out the necessary work. However, this also means that the other machine tools in the machine tool center can no longer be served by the loading device if the safety of the operator is given priority.

In other words, as long as the operator is busy with one of the machine tools through the operator door the appliance cannot move the loading device past this machine tool without endangering the operator.

SUMMARY OF THE INVENTION

In view of the above it is an object of the present invention to improve the known machine tool center such that it can be better used with a less complicated construction whereby an increased work safety for the operator and improved functional reliability of the machine tool are to be achieved.

This object is achieved by the invention in that the loading device is arranged below the working space of the machine tool.

The object underlying the invention is thus achieved in full. The inventors of the present application have namely recognized that the loading device can thus be mounted underneath the working surface of the machine tool, as it were, so that the operator door remains free for set-up and service work, repairs, etc. This further means that all other machine tools in the new machine tool center can still be served by the loading device at no risk to the operator.

Since the loading device is arranged beneath the working space of the machine tool it is thus also automatically almost completely within the external contour, in other words the casing of the machine tool or machine tool center, so that the necessary floor space required for the machine tool center is also reduced.

It is hereby preferred if the respective machine tool displays a loader space, in which the loading device is arranged preferably within a casing of the machine tool, in front of its respective machine stand which supports a workpiece table arranged in the respective working space.

The advantage of this is that the loading device is on the one hand arranged favorably in a space which either already exists in the machine tool or which can be provided with no great problem. Since the loading device may be located within the machine tool's casing, this ensures a particularly safe protection for the operator working on a machine tool past which the loading device is moving to serve a machine tool downstream from the machine tool which is, for example, being repaired.

It is furthermore preferred that the loader space is connected to the respective working space by a respective loading opening through which the loading device changes the workpieces.

This measure is particularly advantageous with respect to the functional reliability of the machine tool center since the working space of the respective machine tool is not completely open to the loader space but is only connected to this via a loading opening so that any chips produced during machining of the workpiece, drilling water used, etc. only affects the loading device to a minor extent. If the loading opening is designed and arranged in a geometrically favorable position this soiling of the loading device can be kept very small.

In a further embodiment it is however preferred if the loading opening has a cover which is opened to change a workpiece.

This thus ensures complete protection of the loading device against soiling. The cover is only opened when a workpiece is changed, whereby the machine tool itself is inoperative during this workpiece change so that no dirt can pass through the open loading opening into the loader space. This measure thus also contributes to the functional reliability of the new machine tool center.

That is then further preferred that the cover is mechanically and/or electrically/electronically locked when the operator door is open.

This measure further increases the work safety for the operator since it prevents the loading device entering the working space of a machine tool on which an operator is working, e.g. to change tools. This lock can either be effected purely mechanically, so that when the operator door is open a mechanical limit stop or similar prevents the process control from releasing the cover for the loading opening. Further measures may possibly be provided which prevent the loading device from attempting to change a workpiece through a closed loading opening.

In the course of the progressive electrical/electronic control of machine tools it can also be provided that the control devices provided to open the cover are blocked by the process control as soon as the operator door is opened.

It is generally preferred that the loading device display a loader serving as a workpiece changer which moves longitudinally along a guide rail whose cross-section is preferably profiled.

This measure is advantageous with respect to the simple construction of the machine tool center since only one loader is required although a number of different machine tools may be provided in a line or circle in the new machine tool center. Although it would be possible to move the workpieces in the loader space and to provide a workpiece changer for every machine tool analogous to the tool changer, the concomitant costs would, however, be considerable.

It is hereby preferred if the loader displays a drive unit which automatically runs along the guide rail.

This measure is also advantageous from a constructional point of view since no chains, belts or similar facilities such as are otherwise often used in machine tools, are required to move the loader between the machine tools and loading/unloading station. The loader is thus a self-propelled workpiece changer, in a manner of speaking.

It is furthermore preferred that the loader display a swivel arm which is retracted when the loader is moving, and which is at least partly swiveled into the working space through the loading opening to change the workpiece.

The advantage of this is that the loading device requires only a small space, the loader is folded away, as it were during movement so that the loading device can be arranged in a very small space beneath the working space of the machine tools.

In a further embodiment it is then preferred if a double gripper for workpieces is arranged on the swivel arm.

The advantage of this measure is that the workpiece can be changed very quickly, the double gripper namely grasps the workpiece which has just been finished and replaces this with a new workpiece to be processed in one movement, following which the swivel arm is retracted into the loader space. This very fast workpiece change leads to the further advantage that more machine tools can be arranged alongside one another in the new machine tool center since the loading device can now serve more other machine tools within the machining time normally required by one of the machine tools to process the workpiece which has just been inserted.

On the whole it is preferred that the workpieces are clamped in workpiece holders which are fitted in fixture holders located in the respective working space of the respective machine tool.

This also advantageously increases the functional reliability of the new machine tool center since the fixture holders and the loading device only have to be designed to accommodate these workpiece holders so that various workpieces can be processed with no set-up times.

It is further preferred that the loading/unloading station comprise a clamping station in which the workpieces are changed in the workpiece holders.

This measure is on the one hand advantageous from a constructional point of view since the new machine tool center can now be operated fully automatically, as it were. A further advantage of this measure is that the new machine tool center only requires two workpiece holders more than the number of machine tools in the machine tool center. One of the additional workpiece holders is located in the clamping station and is fitted with a new workpiece whereas the second additional workpiece holder is in the loader and is exchanged with another workpiece holder with finished workpiece in the machine tool.

It goes without saying that it is also possible to have workpieces processed in sequence by various machine tools in the new machine tool center. The loading device then inserts, e.g., an unmachined workpiece into a first machine tool and removes a finished workpiece, which is then inserted into a second machine tool, whereby a workpiece which has been subjected to two working cycles is then removed from this machine. This workpiece can then be exchanged in a third machine tool for a workpiece which has already been processed in this third machine, etc.

Summing up, the advantages of the new machine tool center thus lie in the fact that the loading device arranged beneath the working spaces can still be operated if one or more machine tools are being serviced. The loading device then moves beneath these machine tools which are at present inoperative and only serves the other machine tools in the machine tool center. Since the loading device is now arranged in the separate loader space this also ensures the maximum possible work safety for the operator. The special design of the loader space and loading device also ensure that the loading device is protected against the penetration of dirt and only accesses the working space of a machine tool when the operator door is closed. This improves the work safety and also the functional reliability of the loading device. The use of workpiece holders and a self-propellant workpiece changer also guarantees a rapid workpiece change with a relatively simple construction and little use of material so that it is possible to select a relatively high number of machine tools per machine tool center at low cost.

It is hereby generally preferred that the cover display a flap cover, essentially vertical when closed, which is partly covered by an essentially horizontal running sliding cover.

The advantage of this is that through the combination of these two covers the largest possible loading opening can be provided during a workpiece change whereby the geometric arrangement of the sliding cover to the flap cover as mentioned ensures that no dirt penetrates the loading device when the cover is closed.

Further advantages can be derived from the description and enclosed drawing.

It is understood that the aforementioned features and those to be explained in the following can be used not only in the specified combinations but also in other combinations or alone without going beyond the scope of the present invention. One embodiment of the invention is shown in the drawing and will be explained in more detail in the following description. In the drawings:

DETAILED DESCRIPTION OF THE PREFERRED EMBODIMENT

Figure 1:
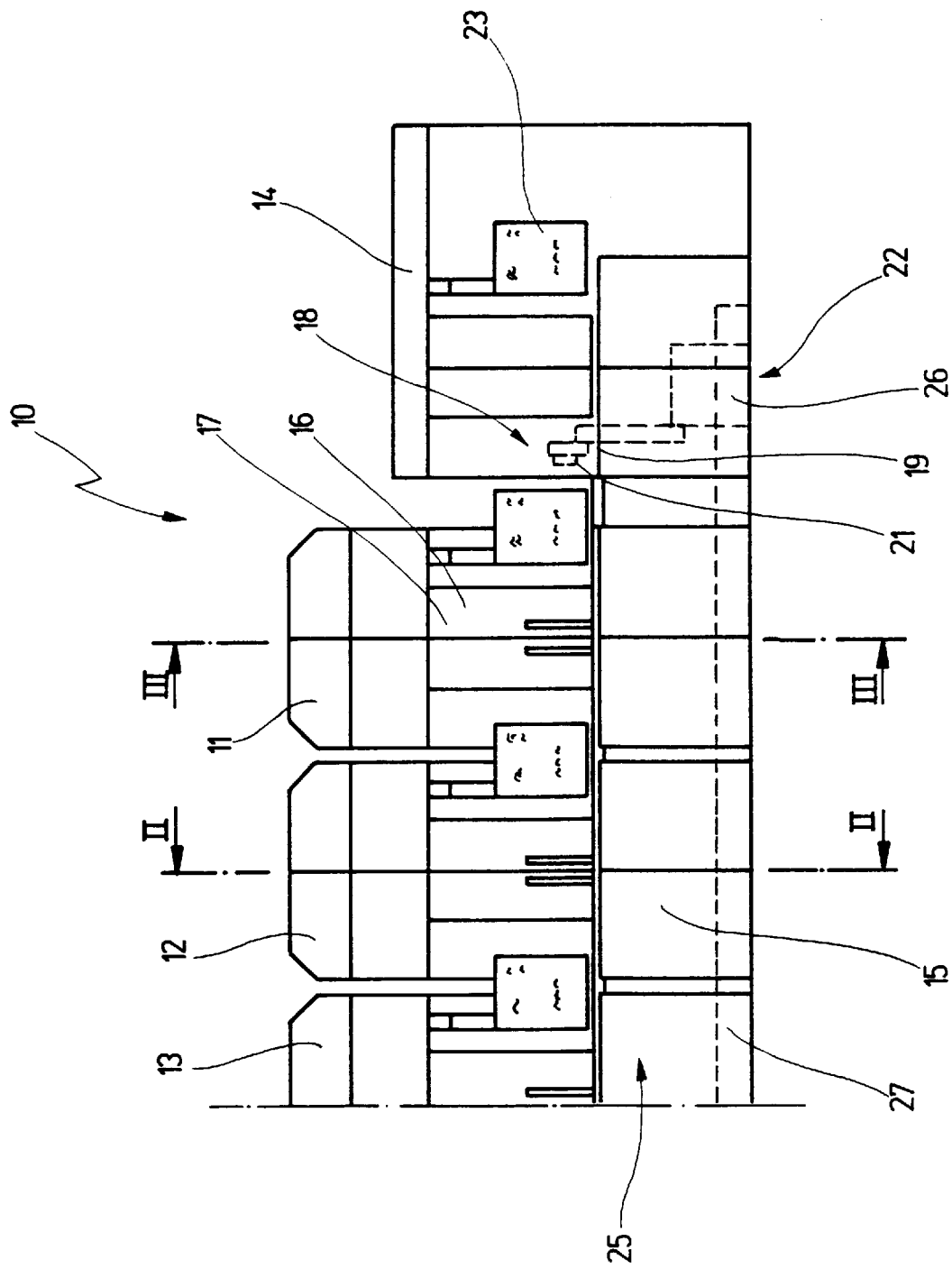
FIG. 1 shows a front view of the new machine tool center in detail.

FIG. 1 shows the front view of a machine tool center 10 in which the machine tools 11, 12 and 13 (only indicated) are arranged alongside one another. These machine tools 11, 12, 13 can either be arranged in a straight line or circle. A loading/unloading station 14 is provided in addition to the machine tools 11, 12, 13.

The machine tools 11, 12, 13 display a casing 15 which completely surrounds them and in which there is an operator door 16 for each machine tool 11, 12, 13 through which an operator has access to the working space 17. Set-up and service work is carried out for the individual machine tools 11, 12, 13 through this operator door 16.

A clamping station 18, shown only diagrammatically, is provided in the loading/unloading station 14 in which individual workpiece holders 19 are provided with workpieces 21 to be processed. The workpiece holders 19 provided with workpieces 21 in this manner are transported to the individual machine tools 11, 12, 13 by means of a loading device 22 and inserted into the respective working space 17 and processed. The finished workpieces 21 are transported from the working spaces 17 back to the clamping station 18 in their workpiece holders 19 where they are exchanged for new workpieces 21 which are to be processed.

In FIG. 1 it can also be seen that there is operator console 23 at each of the machine tools 11, 12, 13 and the loading/unloading station 14 via which the normal operator commands can be entered.

In accordance with the invention, the loading device 22 is arranged in a loader space 25 in the new machine tool center 10 from FIG. 1 which is located beneath the working spaces 17 of the machine tools 11, 12, 13 and preferably inside the casing 15. In this loader space 25 a loader 26 moves back and forth along a guide rail 27 and hereby transports the workpiece holder 19 containing workpieces 21 between the clamping station 18 and the working spaces 17.

On account of the special arrangement of the loading device 22 the operator doors 16 of the machine tools 11, 12, 13 are accessible to operators at all times without these being endangered by the loader 26 which may be passing by.

Figure 2:
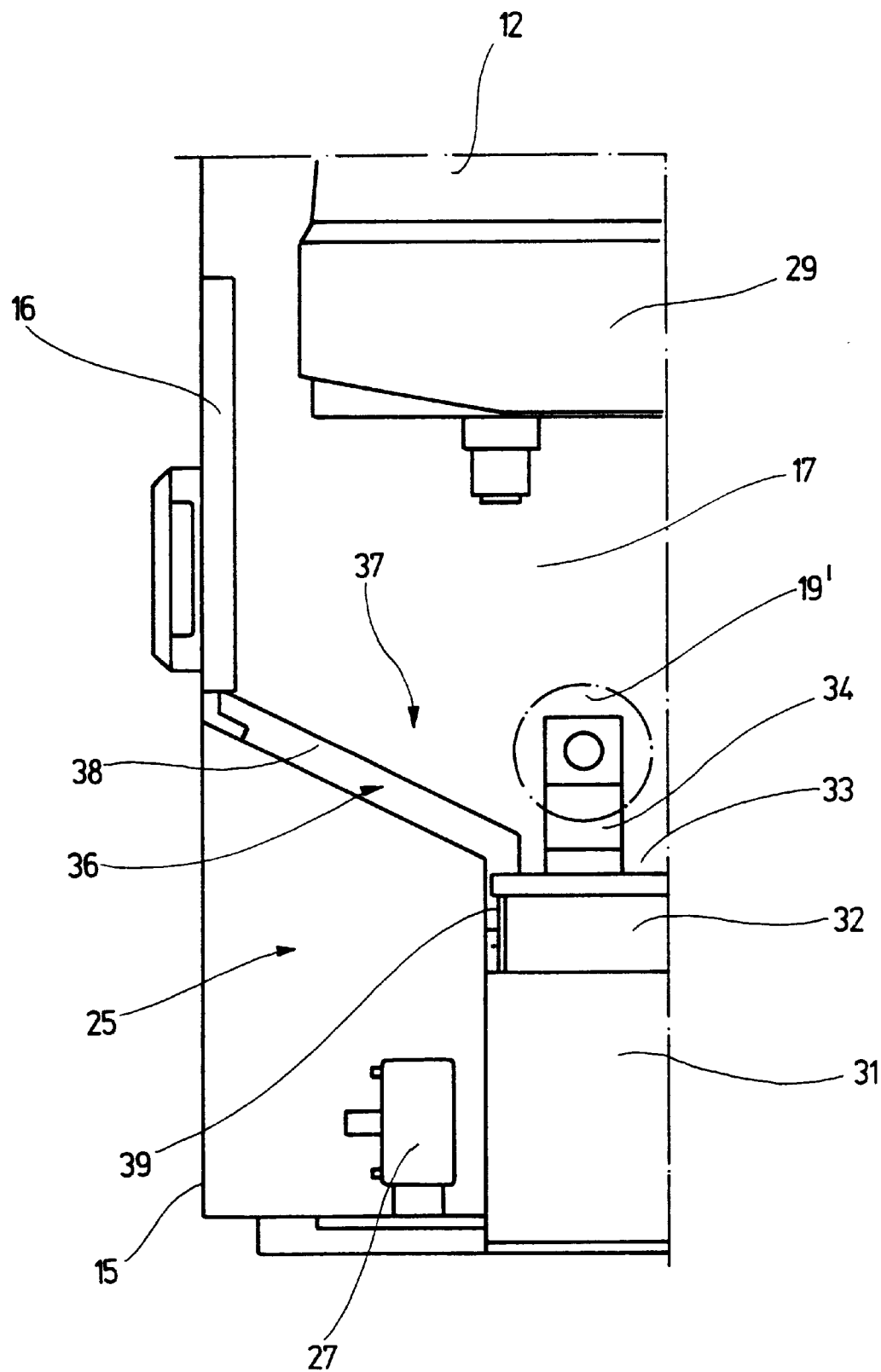
FIG. 2 shows a section through the machine tool center from FIG. 1 along line II—II, without loader in the loader space.

FIG. 2 shows a cross-section through the machine tool 12 as a detail of a sectional view along line II—II from FIG. 1, whereby a spindle head 29 is indicated which is provided to process the workpiece in the working space 17.

The machine tool 12 comprises a machine base 31 on which a diagrammatically indicated workpiece table 32 is provided which in a manner of speaking fixes a working surface 33 in the working space 17. A fixture holder 34 is arranged on the workpiece table 32 which is designed to grip the workpiece holder 19 and hold this during processing by tools provided in the spindle head 29. In FIG. 2, 19' indicates a workpiece holder holding a finished workpiece whereby the workpiece holder 19' is only diagrammatically indicated by a circle.

In FIG. 2 it can clearly be seen that in the representation shown therein the loader space 25 is arranged to the left of the machine base 31 below the working space 17 and at least partly below the working surface 33. Furthermore, it can also be clearly seen that in cross-sectional view the loader space 25 is arranged within the casing 15.

The loader space 25 is connected to the working space 17 by a loading opening 36. A cover 37 is hereby provided which is closed during processing of the workpiece by tools in the working space 17 so that no dirt can enter the loader space 25.

The cover 37 is designed in two parts and comprises a sliding cover 38, which points upwards in FIG. 2 and is inclined towards the working surface 33, and a flap cover 39 which runs roughly vertical to the working surface 33 and can be closed on this. It can be seen that the sliding cover 38 overlaps over the flap cover 39 so that splashing drill water, flying workpiece chips, etc. cannot enter the loader space 25 between the sliding cover 38 and flap cover 39.

The cover 37 is locked with the operator door 16 in such a way that the cover 37 can only be opened when the operator door 16 is closed, though this is not shown in more detail in FIG. 2. In this way it is ensured that an operator working in the working space 17 on the machine tool 12 cannot be injured by a sudden workpiece change. Moreover, if the operator door 16 is open, suitable control measures ensure that the loader 26 passes by this machine tool and serves the next machine tool so that the failure of one machine tool in the machine tool center 10 does not lead to the complete failure of the machine tool center. Thus, machine tools which are downstream, viewed from the loading/unloading station 14, from the machine tool which is currently being serviced can still be supplied with new workpieces by the loading device 22.

Figure 3:
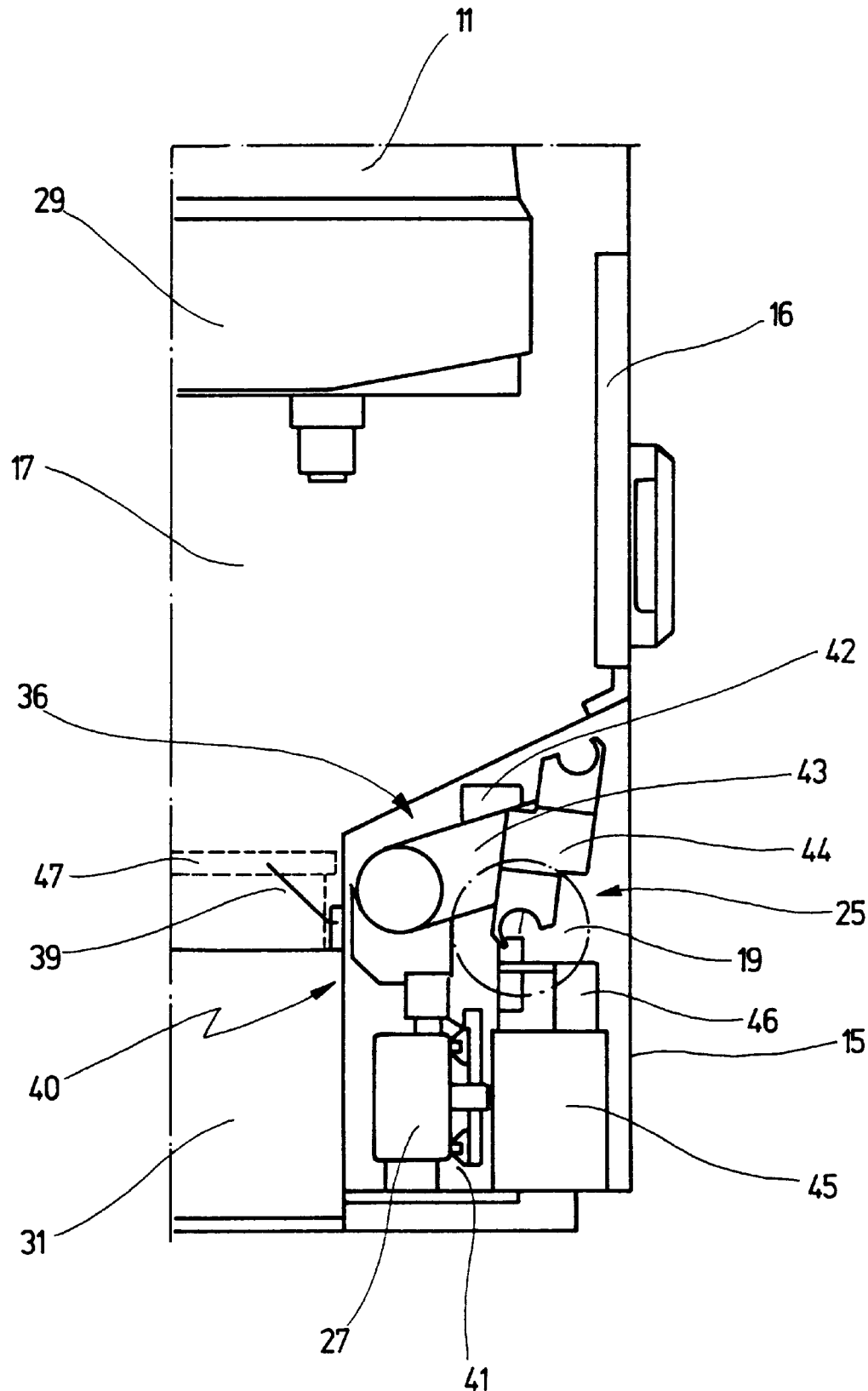
FIG. 3 shows a section along line III—III from FIG. 1 with a loader in position and retracted swivel arm.

FIG. 3 is a view similar to that in FIG. 2, though along line III—III from FIG. 1 showing the situation when the cover 37 is open and the loader 26 has entered the area beneath the working space 17, in this case of machine tool 11.

This loader 26 is a self-propellant workpiece changer 40, as it were, displaying a drive unit 41 with motor 42 on a guide rail 27 which ensures the mobility of the loader 26 along the guide rail, whose cross-section is preferably profiled, in a suitable manner.

The moveable workpiece changer 40 also displays a foldaway or sliding swivel arm 43 fixed to this which is retracted in FIG. 3 so that it is located in the loader space 25. A pivoted double gripper 44 is arranged on the top end of the swivel arm 43 which carries a workpiece holder in one hand whereas the other hand is still empty.

In FIG. 3 it can clearly be seen that the loader 26 is folded away in a compact manner in the position show so that the loader space 25 can be arranged in front of the machine base 31 and beneath the working space 17 without the outer contour of the machine tool having to be significantly changed.

In FIG. 3 a common trailing cable installation 45 can also be seen which provides electrical, pneumatic and possibly hydraulic connections 46 for the loader 26 and connects this via the connections 46 to the corresponding control unit/operator console 23.

In FIG. 3 a workpiece table 47 can also be recognized behind the flap cover 37 which can have, e.g. an abutment so that clamped workpieces can be centered better.

Figure 4:
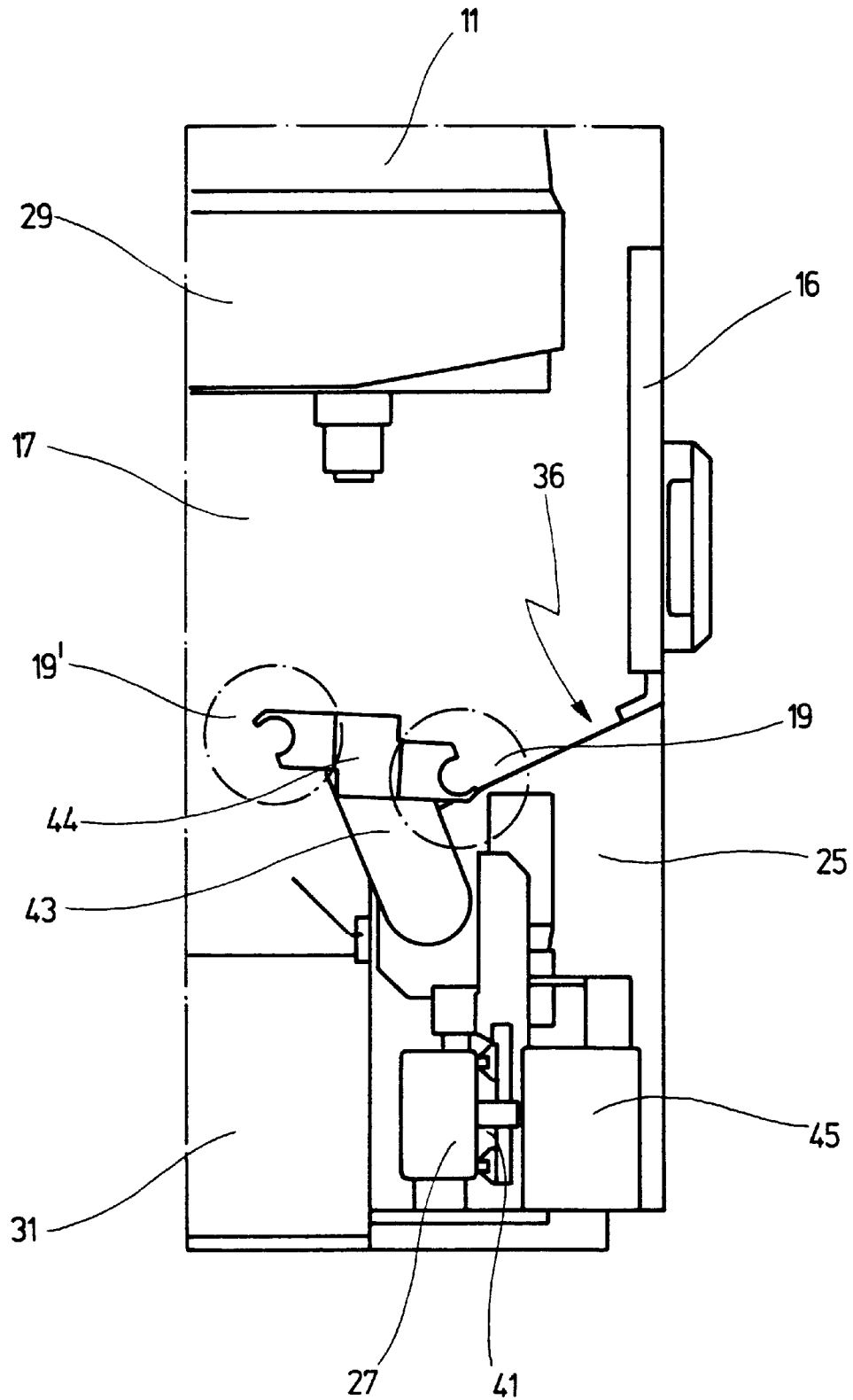
FIG. 4 shows a representation as in FIG. 3, though with extended swivel arm.

In the representation in FIG. 4, which otherwise corresponds to FIG. 3, the swivel arm 43 has been pivoted or extended through the loading opening 36 into the working space 17 where the double gripper 44 has already gripped the workpiece holder 19', bearing a workpiece which has already been processed by the machine tool 11. The workpiece holder 19 and workpiece holder 19' are now exchanged through a swivel movement around 180° in the plane of FIG. 4 so that the fixture holder 34 which can be seen in FIG. 2 can accept the workpiece holder 19 with the as yet unprocessed workpiece. The swivel arm 43 is then folded away or retracted so that the position shown in FIG. 3 is assumed.

Finally, the cover 37 is closed so that the new workpiece can be processed in the working space 17 in the machine tool 11 whilst the loader 26 brings the workpiece holder 19' to the loading/unloading station 18 and exchanges this for a workpiece holder 19 which has been provided with a workpiece still to be processed in the clamping station 18.

What I claim is:

1. A machine tool center, comprising:
    at least one machine tool each having a casing and a working area for processing workpieces and accessible through an operator door;

a loading/unloading station for the workpieces;

a loader space which is arranged within the casing and below the working area of the respective machine tool, said loader space being connected to the working area by a loading opening, the loading opening comprising a cover which is opened to change a workpiece; and a loading device for transporting the workpieces between the loading/unloading station and the respective machine tool and for changing the workpieces at the respective machine tool, said loading device being arranged within the loader space;

wherein the loading device is arranged in front of a respective machine stand which supports a workpiece table arranged in the respective working area, the workpieces are clamped in workpiece holders which are fitted in fixture holders located in the respective working area of the respective machine tool, and the loading/unloading station comprises a clamping station in which the workpieces are exchanged in the workpiece holders.

2. The machine tool center of claim 1, wherein the loading device comprises a loader serving as a workpiece changer which moves longitudinally along a guide rail.

3. The machine tool center of claim 2, wherein the loader comprises a drive unit which automatically runs along the guide rail.

4. The machine tool center of claim 3, wherein the loader comprises an arm which is retracted when the loader is moving, and which is at least partly moved into the working space through the loading opening to change the workpiece.

5. The machine tool center of claim 4, wherein a double gripper for workpieces is arranged on the arm.

6. The machine tool center of claim 4, wherein the arm is a swivel arm that is swiveled into the working space.

* * * * *